Oct. 26, 1926.

C. R. DOWNS 1,604,739

APPARATUS FOR PROMOTING CATALYTIC REACTIONS

Filed Dec. 5, 1921      4 Sheets-Sheet 1

INVENTOR
CHARLES R. DOWNS
BY Chas. W. Mortimer
ATTORNEY

Oct. 26, 1926.
C. R. DOWNS
1,604,739
APPARATUS FOR PROMOTING CATALYTIC REACTIONS
Filed Dec. 5, 1921 4 Sheets-Sheet 2
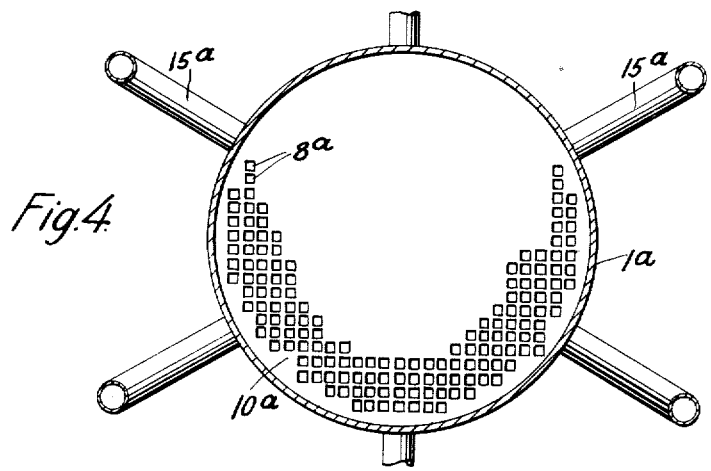
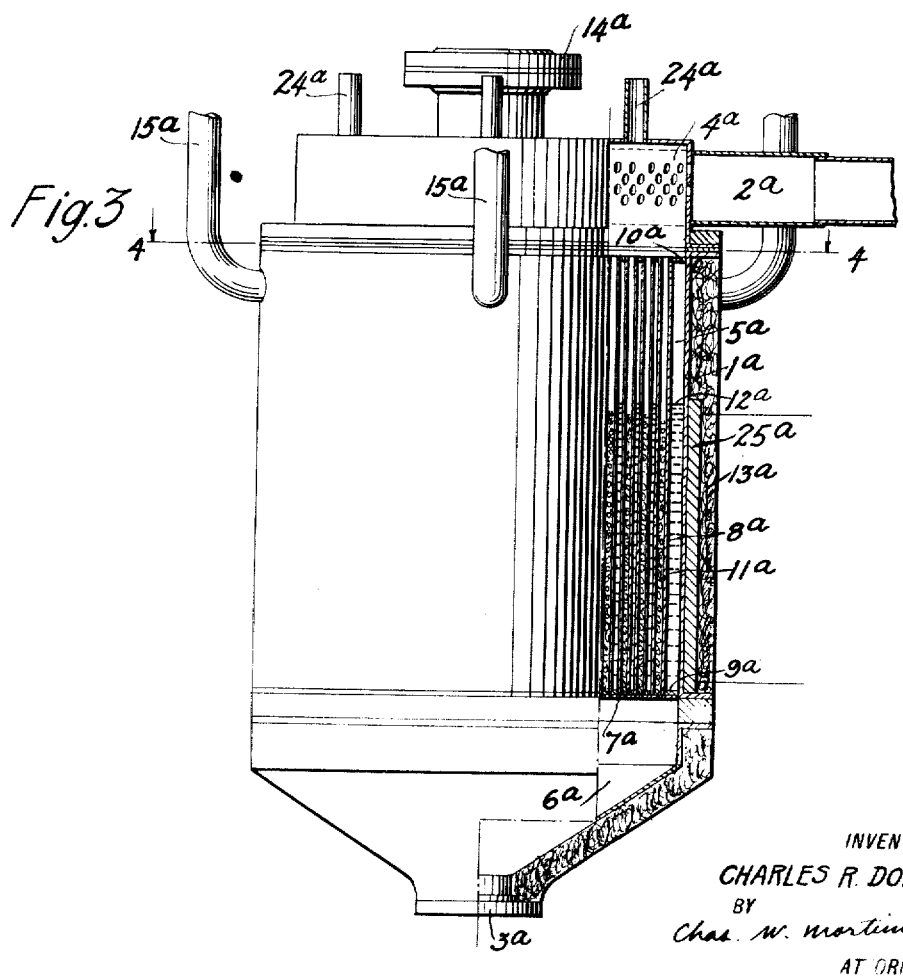
INVENTOR
CHARLES R. DOWNS
BY
Chas. W. Mortimer
ATTORNEY Oct. 26, 1926.

C. R. DOWNS 1,604,739

APPARATUS FOR PROMOTING CATALYTIC REACTIONS

Filed Dec. 5, 1921 4 Sheets-Sheet 4

INVENTOR
CHARLES R. DOWNS
BY
Chas. W. Mortimer
ATTORNEY

Patented Oct. 26, 1926.

1,604,739

UNITED STATES PATENT OFFICE.

CHARLES R. DOWNS, OF CLIFFSIDE, NEW JERSEY, ASSIGNOR TO THE BARRETT COMPANY, A CORPORATION OF NEW JERSEY.

APPARATUS FOR PROMOTING CATALYTIC REACTIONS.

Application filed December 5, 1921. Serial No. 519,817.

This invention relates to improved apparatus for carrying out catalytic reactions, and for controlling the temperature of such reactions.

In carrying out certain catalytic reactions, such as reactions of partial oxidation of organic compounds, which are strongly exothermic, it is important to control the temperature and keep it within proper limits. If the temperature of the catalyst and of the reacting gases is not sufficiently high, the desired reaction either does not take place at all, or takes place only to a small degree. It is accordingly necessary to maintain the temperature sufficiently high for the reaction to take place, and to prevent it from falling below the necessary reaction temperature. On the other hand, with gas phase reactions which are strongly exothermic, such as reactions of partial oxidation of organic compounds, it is essential to prevent the temperature from rising too high, in order to prevent over-oxidation and destruction of the compounds desired. The proper control of the temperature of such catalytic reactions is accordingly of primary importance, and upon it largely depend the degree of conversion and the yield of the desired product. The problem of temperature control in the case of vapor phase partial oxidation of organic compounds in the presence of a catalyst is particularly difficult, since here occur enormous heat developments with reagents of low specific heat and poor heat conductivity.

It is difficult to regulate and control the temperature of such catalytic reactions by the circulation of cooling fluids through pipes or ducts disposed throughout the reaction chamber owing to the large amount of heat of reaction which must be absorbed, and the necessity for absorbing this heat without cooling the reaction chamber below the necessary temperature of reaction. If the cooling fluid is circulated through the reaction chamber at a temperature at or near the desired reaction temperature, an excessive amount of cooling fluid is required. If a smaller amount of fluid is circulated at a much lower temperature, a considerable temperature difference must exist between the reaction temperature and the circulating medium in order to maintain the requisite heat flow. This means that parts of the reaction chamber immediately adjacent to the pipes or ducts, through which the fluid is being circulated, may be too low in temperature for proper reaction, and that the whole reaction chamber may drop below the proper temperature range unless the volume of the cooling fluid is definitely regulated and controlled. Even where the volume of cooling fluid is so regulated, there is necessarily a considerable variation in temperature as the heat is transferred from the reaction temperature to the circulating fluid at a greatly lower temperature. Furthermore, in order to regulate the cooling fluid in any such system (where a cooling fluid is circulated through pipes or ducts) there is required practically constant supervision of valves or other regulating means which control the flow of fluid, together with a great many temperature measuring instruments to show temperatures at various points in the reaction chamber, and the operating costs of such apparatus are high.

The present invention provides an improved apparatus for carrying out of catalytic relations, in which such difficulties are overcome, and which enables such reactions to be carried out with substantially continuous and automatic control of the reaction temperature uniformly within reasonable limits, regardless of variations in the reaction mixture, or its rate of flow or in the condition of the catalytic substance. In the improved apparatus of the present invention, use is made of the principle that vaporizable liquids will absorb latent heat, without change in temperature, in changing from the liquid to the vapor state. In applying this principle, according to the present invention, the catalytic apparatus is provided with a two-phase liquid-vapor temperature regulating system containing vaporizable liquid distributed through the reaction zone in heat interchanging relation with the catalyst and reacting gases.

By constructing the catalytic apparatus with a two-phase liquid-vapor temperature regulating system, disposed throughout the reaction zone, and by providing such a system with means for varying and controlling its pressure, and by the selection of a suitable liquid for use in the system, it is possible to maintain the liquid in the reaction zone at a temperature which is very near that of the catalytic reaction, i. e., within the temperature range most suitable to form the desired products. Such a liquid at its boiling point can absorb large quantities of heat without change of temperature, so long as the pressure remains constant and so long as both phases (liquid and vapor) are present. Moreover, the liquid when boiling will be at the same temperature even in remote parts of the temperature regulating system. The boiling of the liquid will agitate and uniformly distribute the liquid.

By providing such a system with suitable condensing means for condensing the vaporized liquid and returning it to the reaction zone, the liquid can be continually maintained in a liquid state at its boiling point, and the temperature of the reaction zone can thereby be maintained constant over long periods of time, inasmuch as the heat of reaction will be absorbed in the boiling and vaporizing of the liquid, and inasmuch as the supply of liquid will be automatically replenished by the condensation of the vapors and the return of the liquid. By providing a two-phase cooling system of the character referred to I have found that very little supervision is necessary, since the absorption of the heat of reaction will go on continually and automatically without temperature change, owing to the boiling of the liquid under constant pressure.

The liquid which is used in the two-phase liquid-vapor system of the present invention may vary with different catalytic reactions, depending upon the temperature of the reaction and the boiling point of the liquid. The same liquid, however, under different pressures, will have different boiling points. Accordingly, by increasing the pressure on the system, the boiling point of the liquid can be increased, and the liquid can thereby be made available for controlling the temperature of reactions which require higher temperature. Similarly, by the maintenance of a vacuum, the boiling point of the liquid can be correspondingly lowered and the liquid thereby made available for the regulation of reactions which take place at a lower temperature. For many purposes, mercury possesses special advantages for use as a temperature controlling liquid in the apparatus of the present invention. The boiling point of mercury under atmospheric pressure is 357° C., and, by increasing or decreasing the pressure, the boiling point can be correspondingly increased or decreased. For example, by varying the pressure on the system from high vacua to as much as 200 lbs. or more, it becomes possible to control catalytic reactions which vary in temperature from around 250° C. up to around 600° C.

Different pressure controlling and regulating means can be used for automatically maintaining a constant pressure on the temperature regulating system of the present invention. For example, the pressure on the system may be varied and regulated by such means as a pressure or vacuum pump provided with suitable regulating and controlling means, or by the use of cylinders of inert gas, together with suitable regulating valves.

In the carrying out of catalytic reactions on a commercial scale, the catalyzer chambers or converters are necessarily of considerable size, and they must contain a substantial amount of catalyzer, through which or in contact with which the reaction vapors must pass. According to the present invention, the temperature regulating means is intimately distributed throughout the zone of reaction containing the catalyzer, so that all parts of the catalyzer are subjected to the temperature controlling influence of the system. The catalyzer itself may, for example, be contained in a series of separate small compartments, or in a series of separate layers of small bodies, in intimate but indirect contact with the liquid in the system. The catalyzer may be in a more or less loose or granular form adjacent to surfaces that are cooled by the cooling fluid. One advantageous arrangement of the catalyzer is in the form of a layer or bed through or into which extend the tubes or compartments containing the cooling liquid. Another advantageous arrangement of the catalyst is in tubes or small compartments surrounded by the cooling liquid. The particular arrangement of the catalyst and cooling or temperature regulating system is capable of considerable variation, but the cooling system should be so distributed throughout the catalyzer, or the catalyzer should be so distributed with respect to the cooling system, that all parts of the catalyst body will be subjected to the cooling and temperature controlling influence of the cooling system and be thereby maintained at the desired constant temperature.

The cooling system itself is capable of considerable variation in its construction and arrangement. Valves and regulating means suitable for controlling gas pressure within very close limits are available at low cost and their operation may be entirely automatic, requiring almost no supervision. The cooling system may, as above indicated, take the form of a large number of small pipes or tubes extending through or into the layer or body of catalyst in the reaction zone; or it may take the form of a series of narrow compartments between which the cooling fluid is maintained; or it may take other form which will serve to distribute the liquid throughout the reaction zone. Where the cooling system is in the form of tubes or pipes extending throughout the reaction zone, these tubes or pipes are preferably united together or joined to a common header at their lower ends so that the liquid in the different tubes or pipes will be continuous.

The two-phase cooling system is provided with means for condensing the vaporized liquid and returning it to the reaction zone. Where the cooling system is made up of a series of pipes containing the cooling liquid, these pipes may be extended and may themselves serve as condensers for condensing the vaporized liquid. It is more advantageous, however, to provide separate cooling means, in the form of reflux condensers which may be cooled by the circulation of a cooling fluid such as air or water and which will insure that all of the vaporized liquid is condensed and returned to the system. Where the liquid in the reaction zone is contained in intercommunicating tubes or spaces, the return of the liquid to any one of the tubes or spaces will insure the maintenance of a substantially constant level in all.

Inasmuch as the catalytic reactions, for which the present apparatus is particularly intended, require a high temperature, it is necessary to heat the catalytic material and the reacting gases or vapors to the reaction temperature. This heating may be brought about by means of a preheater for preheating the gases before they enter the catalytic chamber or compartment. It is an important advantage of the present invention, however, that the catalytic apparatus itself may be provided with heating means for heating the liquid of the temperature regulating system, and thereby heating the catalytic material.

By providing a suitable heater, such as an electric heater, for heating the liquid in the temperature controlling system, this liquid can be raised to its boiling point and maintained at its boiling point, so that the temperature controlling system is adapted to supply an even temperature to the catalyzer material or the reaction zone. The heating of the apparatus in this way enables the reaction zone to be brought to the reaction temperature and to be maintained at the reaction temperature even where the heat of reaction may be insufficient to maintain the desired temperature, and even where the reaction may be endothermic in character, that is, when the reaction is one that absorbs heat, and in which heat must be continually supplied to maintain the reaction temperature.

From one standpoint, therefore, the apparatus of the present invention may be considered to be reversible in character in that it is adapted to maintain a substantially constant and automatic control of the temperature of the reaction irrespective of whether the reaction is strongly exothermic and requires the absorption of a large amount of heat of reaction, or is a reaction which requires the supply of heat thereto. In either case, the maintenance of the temperature regulating means at the boiling point of the liquid, and the substantially uniform distribution of the temperature regulating means throughout the reaction zone, enables the reaction zone to be maintained at a substantially constant temperature approximating that of the boiling point of the liquid; while the temperature can readily be regulated by the use of different liquids and by control of the pressure of the regulating system.

The apparatus of the present invention, accordingly, is of more or less general application for the carrying out of catalytic reactions with substantially constant and automatic regulation and maintenance of the desired reaction temperature. It is particularly adapted for strongly exothermic reactions, such as gas phase partial oxidation of organic compounds, for example, the oxidation of benzene to maleic acid, of naphthalene to phthalic anhydride, of toluene to benzaldehyde and benzoic acid, of anthracene to anthraquinon, etc; and it enables such reactions to be carried out with maximum yields and at minimum operating costs. It is also adapted, however, for use where the heat changes and energy transfers are of a lower order, but where the maintenance of a constant, uniform, and automatically regulated temperature, is desired. Reactions which have heretofore been conducted only with difficulty or with indifferent success can be carried out smoothly and with greatly improved results in the present apparatus, whereas reactions which have been scarcely possible or feasible heretofore on a commercial scale, are brought within the range of practical and economical operation by the present apparatus.

The invention will be further described in connection with the embodiments thereof illustrated in the accompanying drawings, in which—

Fig. 3 shows a modified form of the apparatus, partly in elevation and partly in section;

Fig. 4 is a sectional view taken on the line 4—4 of Fig. 3;

In the modifications of Figs. 3 to 8 inclusive, the same reference numerals are used as in Fig. 1 for the same or corresponding parts of the apparatus, but the reference characters of the modified constructions of the reference letters *a*, *b* and *c* appended thereto.

Figure 1:
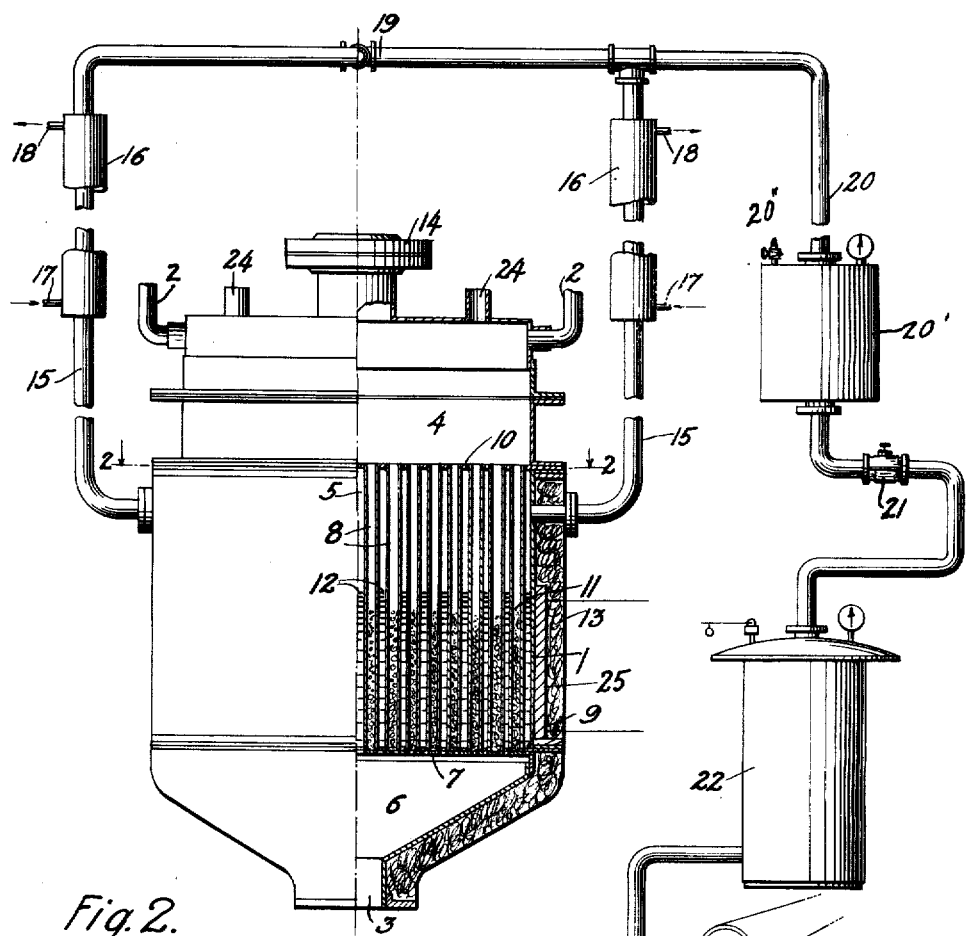
Fig. 1 illustrates, in a somewhat conventional and diagrammatic manner, an apparatus embodying the invention, the catalytic chamber being shown partly in central vertical section and partly in elevation.

The general arrangement of the apparatus and the preferred embodiment of the catalyzer chamber are illustrated in Fig. 1. In this figure the shell of the converter or catalyzer chamber is indicated at 1 and is provided with an inlet or inlets 2 for the gaseous mixture and an outlet 3 for the products of the reaction. It will be understood that the gaseous mixture is prepared in any suitable way and is supplied to the apparatus with the proper proportions of the reacting gases or vapors. It will also be understood that the reaction products are led to a suitable condenser or other suitable means (not shown) for cooling and recovering the products of the reaction. The catalytic chamber has an upper compartment or space 4 in which the entering gases can spread out, a central compartment 5, containing the catalyst and part of the temperature regulating system, and a lower compartment 6 for receiving the reaction gases on their way from the reaction zone to the outlet. In the construction illustrated, the catalyst is contained in a large number of square tubes 8 and is supported by a perforated plate 7 which permits the passage of gases or vapors therethrough. The space around the tubes 8 is closed at the bottom and top of the tubes by headers or suitable closing means illustrated respectively at 9 and 10, so that the space surrounding the tubes 8 forms a continuous temperature regulating system for containing the temperature regulating liquid. The tubes 8 are filled with the catalyst 11 to a suitable height, and the temperature controlling liquid 12 is supplied to the temperature regulating system to a depth slightly more than the depth of the catalyst, so that the catalyst in the tubes will be surrounded on all sides by the liquid surrounding the tubes. The tubes may advantageously be made of drawn seamless steel tubing and suitably spaced apart at their ends by spacing rods or by headers having suitable openings therein, and the whole construction is then preferably welded into an integral and unitary structure, which is adapted to withstand either increased or decreased pressure on the temperature regulating system.

The catalytic chamber is preferably provided with suitable lagging or heat insulating 13 for preventing or reducing the loss of heat by radiation. Suitable heating means, such as an electric heater or heaters 25, are also provided for heating the liquid of the temperature regulating system.

A series of reflux pipes 15 is connected with the upper part of the space around the catalyst tubes 8 and these reflux tubes are shown as provided with condensers 16 having inlets 17 and outlets 18 for the circulating of water or other cooling medium. The reflux pipes are connected at their upper ends by a header 19 which in turn is connected through the pipe 20 and the pressure regulating valve 21 to a tank 22, which in turn is connected with a compressor or vacuum pump 23. An expansion chamber 20' may be interposed in pipe 20 in case the capacity of the pipe 20, header 19 etc., is insufficient to equalize slight momentary fluctuations in pressure. A pet cock 20'' on the tank 20' may serve as a pressure of vacuum release. The pressure in tank 22 may be maintained above that required in the system, the reduction of pressure, or the maintenance of constant pressure for the system being caused by the valve 21, which may be of any of the well known types for this purpose and may be automatic in its operation. Automatic means, not shown, cause the pump 23 to start when the pressure in tank 22 departs a predetermined amount from the desired pressure.

In the operation of the apparatus, the catalyst is charged into the catalyst tubes 8 to a suitable height and the temperature controlling liquid is charged into the space surrounding the tubes to a height somewhat greater than that of the catalyst, and the boiling point of the liquid is regulated by regulating the pressure on the system. The reaction zone can then be heated by the electric heaters 25 which raise the liquid to its boiling point, and the liquid in turn heats the catalyst in the tubes 8 to practically the same temperature. By a proper selection of the liquid and proper regulation and control of the pressure on the system, the boiling point of the liquid is maintained at a temperature approximately that of the catalytic reaction.

For example, in the catalytic oxidation of naphthalene, the proper temperature for the reaction was found to be in the neighborhood of 400° C., and since the boiling point of mercury at atmospheric pressure is 357° C., this liquid can be used to particular advantage in the temperature regulating system. The boiling point of the mercury can be increased or decreased by increasing or decreasing the pressure on the system. The catalyst tubes are sufficiently small, and the walls of the tubes are sufficiently thin and are made of a good heat conductor, so that all parts of the catalyst will be kept at a temperature which does not greatly exceed that of the boiling mercury. In starting the operation, heat may be applied by the heater 25 until the mercury boils. The mixture of air and vaporized naphthalene, in regulated amount and preheated to a temperature above the dew point of the naphthalene, is introduced through the inlet pipe 2 and passes into the tubes 8 where, in the empty space above the catalyst, it is heated by the condensation of a part of the mercury vapors, whereby it reaches the catalyst at substantially the proper temperature for reaction. It then passes through the catalyst. When the heat of reaction raises the catalyst in the tubes to a point slightly higher than the boiling point of the mercury, the mercury boils more vigorously, without however changing its temperature, and the greater the tendency of the temperature of the catalyst to rise above that of the mercury, the more rapidly the mercury will boil. The vaporized mercury rises into the upper parts of the space surrounding the tubes 8 where it serves to further preheat the entering gases and where a part of the mercury may be condensed. At this point, if the lagging on the apparatus is adequate, the heaters 25 may be turned off, and the reaction heat transmitted by the mercury to the incoming air naphthalene mixture is sufficient to maintain adequate preheating. The uncondensed mercury passes into the reflux tubes 15 and into the reflux condensers 16 where the remainder of the vaporized mercury is condensed and returned to the body of liquid surrounding the catalyst tubes. In this way the supply of liquid mercury is replenished so that mercury is always maintained in a liquid state in the reaction zone of the two-phase liquid-vapor system. When the reaction is going on a temperature differential is established between the catalyst and boiling mercury such that the temperature of the catalyst remains substantially constant at any desired point, and this point can be adjusted by varying the pressure on the mercury system. It will be understood that the system is provided with suitable pressure gauges and that the reaction zone is provided with suitable temperature indicating means, such as pyrometers, for indicating the temperature of the reaction. Suitable openings for the introduction of pyrometers are indicated at 24 in Fig. 1.

The products of the catalytic reaction pass out through the compartment 6 and the outlet 3 to a suitable receptacle or condenser (not shown). In the case of naphthalene, for example, phthalic anhydride is obtained as the primary product of the reaction.

Where the specific heat of a fluid is used or where latent heat at a low temperature is employed for heat removal, absolute reliance must be placed upon the readings of temperature measuring instruments such as to indicate the temperature. Should these change in their millivoltage or resistance or fail entirely, the actual temperature of the catalyst is unknown and likewise the proper amount of cooling fluid to be supplied. An advantage of the present invention is that, should the pyrometers fail, it is not serious at all because the temperature of the boiling liquid is known from the pressure applied. In fact, no pyrometers at all are needed in the catalyst once the heat transfer characteristics of the apparatus are known.

In order to insure that all parts of the catalyst are maintained within a temperature range which does not vary too greatly from that of the boiling liquid in the temperature regulating system, it is important that all parts of the catalyst should be within effective range of the liquid. If any considerable distance separates any part of the catalyst from the cooling surfaces of the temperature regulating system, such part of the catalyst may rise to a temperature considerably above that of the boiling liquid. The cooling system or temperature regulating system should accordingly be so distributed throughout the reaction zone, and the catalyst should be kept in such subdivided condition or thin layers, that all parts of the catalyst will be kept within the desired temperature range, i. e., the apparatus to function properly should maintain a catalyst temperature at the point of maximum distance from any cooling wall which is not greater than the permissible temperature range for the reaction. The spaces containing the catalyst should accordingly be sufficiently small, or the catalyst medium should be of sufficient heat conductivity so that all parts of the catalyst may be kept within the proper temperature range.

With an apparatus such as illustrated in Fig. 1 with the tubes 8 made of square drawn seamless steel tubing of about 16 gauge wall and with internal diameter of the tubes of about ⅝ inch, and with the tubes spaced apart a distance of about ⅛ inch between tubes, and with a catalyst which is a good heat conductor, and with a ratio of cooling surface to catalyst bulk of about 6.4 square inches of surface to 1 cubic inch of catalyst bulk, and with the use of mercury in the temperature regulating system, it is readily possible to maintain the temperature of the catalyst within a range which is practically never more than 50° higher than the mercury temperature, and which may not be more than 20° to 30° higher than such boiling temperature. The variation of any one point in the catalyst from hour to hour is relatively small, for example, not more than about 3° to 5°, even in such highly exothermic reactions as the oxidation of benzene to maleic acid. This temperature regulation, moreover, is practically automatic, so that the reaction as a whole can be considered to take place at substantially a constant, uniform and automatically regulated temperature. The apparatus accordingly requires a minimum of attention, only occasional adjustment of the valves controlling the feed of the reaction mixture being necessary, while the pressure of the mercury system can be maintained substantially constant with only occasional supervision and adjustment.

The apparatus illustrated in Fig. 1 has been found highly satisfactory for use in the catalytic oxidation of the benzene, naphthalene, toluene and anthracene, and enables improved yields of the desired products of partial oxidation thereof to be obtained. In such catalytic oxidation reactions, the catalyst used will, of course, be one appropriate thereto. Vanadium oxide, for example, distributed upon a suitable carrier, is well adapted for use in such catalytic reactions of partial oxidation. I have found it particularly advantageous to use a carrier for the catalyst which is a good heat conductor; for example, "grained" aluminum, as a carrier for vanadium oxide or other appropriate oxidizing catalyst, since the good heat conducting qualities of such a catalyst enable the temperature to be more readily regulated and maintained within the proper limits.

Where the temperature regulating system is to be maintained under a greatly reduced pressure, or at a pressure greatly in excess of atmospheric, it is important that the apparatus be so constructed that it is capable of withstanding the desired degree of vacuum or pressure. It is also important that the temperature regulating system should be a closed system, such that the desired temperature can be continually and automatically maintained therein. The use of drawn tubes of the character described, and the welding of the apparatus together, enables the apparatus to be made sufficiently strong to withstand considerable variations in pressure. The use of square tubes arranged in the manner illustrated also provides a large cooling surface and a high ratio of cooling surface to catalyst bulk, while a small but nevertheless sufficient space is left between the tubes to insure continuous contact of liquid mercury with the cooling surfaces. By using seamless drawn tubing, a thin metal wall is possible without sacrificing mechanical strength, thereby making possible the use of pressure or vacuum in the regulating system without sacrifice of the speed of heat transfer through the tube walls.

As a precaution against explosion, the catalytic chamber may be provided with a safety explosion flange 14 which will give way at a relatively low increase in pressure, and thereby prevent injury to the catalytic chamber.

The provision of an electric heater 25 for heating the shell of the catalytic chamber enables heat to be supplied to the temperature-regulating system, and through it to the catalyst, at the beginning of the process, or at such time as the supply of heat may be desired; while the automatic temperature regulating system nevertheless prevents the temperature from rising too high, regardless of the amount of heat so supplied or by the heat of the catalytic reaction, inasmuch as any increase in heat merely causes more rapid boiling of the mercury, and inasmuch as a continual supply of liquid mercury is maintained by the condensation and return of the mercury vapors. The apparatus will accordingly function in a continuous and automatic manner even with considerable variation in the rate of flow of the reacting gases and in the resulting heat of reaction.

The apparatus of Figs. 3 and 4 is a modified construction in which the tubes 10$^a$ are similar to the tubes 10 of Fig. 1 but in which the shell or jacket is of cylindrical instead of square shape. A cylindrical jacket or shell permits the use of much higher pressures on the boiling liquid and consequently allows a greater range of reaction temperature with the same liquid, and a consequent greater latitude in adaptability of the apparatus to various reactions. The tubes 10$^a$ may be suitably spaced apart, for example, by welding them at their ends to the headers 9$^a$ and 10$^a$. An apparatus thus suitably constructed is capable of use under widely varying pressure conditions, for example, from high vacua to pressures of as much as 250 lbs. or more. By using mercury in the temperature regulating system, and by suitably varying and regulating the pressure, catalytic operations can be carried out at widely varying temperatures, for example, from about 250° C. to around 600° C.

In order to allow equal temperature ranges without such large variations in pressure, other liquids can be used which have different boiling points. Where, however, the boiling liquid is one which may act chemically upon iron (for example, sulfur, which boils at 444° C.), the apparatus should be constructed of a material which is not injuriously affected by the liquid. In the case of sulfur, the vapors of which attack iron at high temperatures, the apparatus can be constructed of aluminum, which is not injuriously affected by the boiling sulfur or sulfur vapors.

Figure 6:
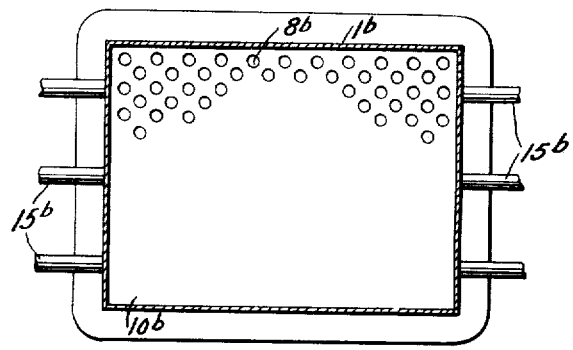
Fig. 6 is a sectional view on the line 6—6 of Fig. 5.
Figure 5:
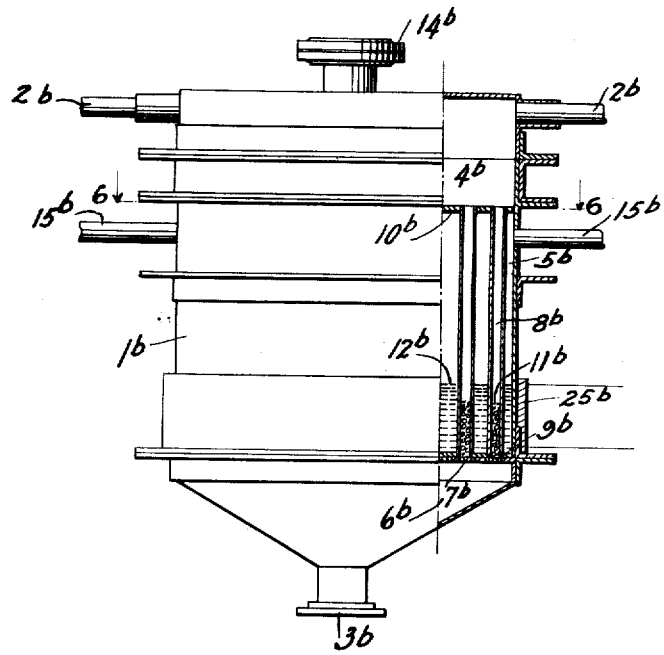
Fig. 5 shows a further modification, partly in elevation and partly in section.

In the apparatus of Figs. 5 and 6, the catalyst is contained in round tubes 8$^b$, which may be made of seamless drawn steel tubing, with their ends suitably secured to the tubes sheets 9$^b$ and 10$^b$. The shell 1$^b$ may also be strengthened by angle iron as shown.

Figure 2:
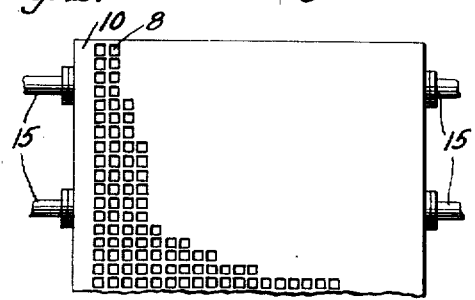
Fig. 2 is a view on a somewhat reduced scale taken on the line 2—2 of Fig. 1, a part only of the catalyzer tubes being indicated.

The apparatus of Figs. 5 and 6 is generally similar in its construction and operation to that of Figs. 1 and 2, but the provision of round tubes instead of rectangular tubes enables the tubes to be rolled into a tube sheet as in ordinary boiler construction or to be welded the same as square tubes.

It will be evident that the apparatus of this modification, as well as the apparatus of Figs. 1 to 4, may be varied in its construction, for example, in the number, length, size and arrangement of the tubes, and in the size of the apparatus and its construction and the spacing of the tubes therein, within the limits of mechanical construction, and of heat transference required for any particular reaction.

Figure 8:
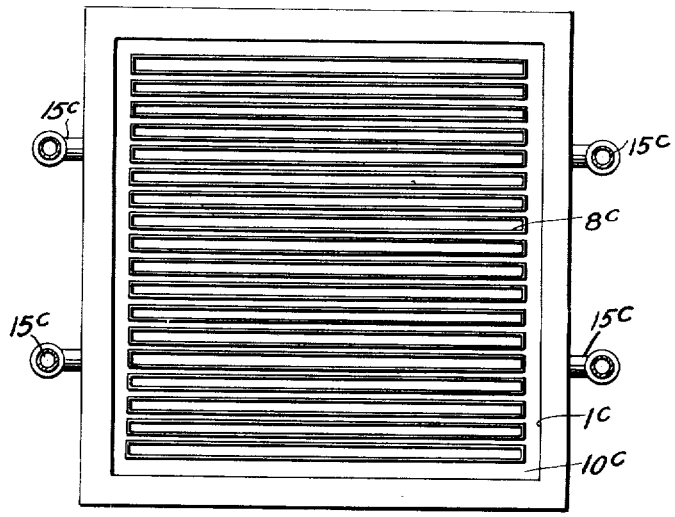
Fig. 8 is a sectional view on the line 8—8 of Fig. 7.
Figure 7:
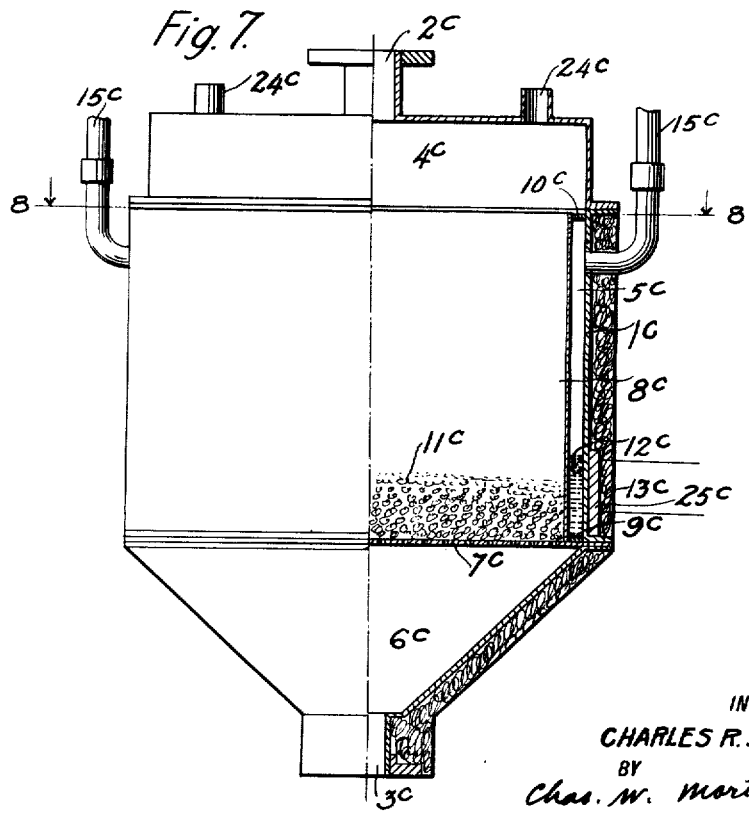
Fig. 7 shows a still further modification of the apparatus, partly in elevation and partly in section.

In the apparatus of Figs. 7 and 8, the catalyst is arranged in a series of long narrow tubes or slots 8e which may be constructed, for example, of sheet metal. These compartments or slots are open at the top and bottom and are separated from each other and have the space between them at the ends closed by suitable headers or closing means 9e and 10e to which the compartments or tubes are welded. The catalyst is supported in the compartments by the perforated plate 7e which extends over the whole bottom of the tube or compartment section. The temperature-controlling liquid is charged into the space surrounding the catalyst tubes or compartments. This space is a continuous compartment consisting of the slots between the catalyzer tubes and the two slots at the ends of the catalyzer tubes. That is, the spaces between the catalyzer tubes communicate with each other through the common end slots so that all of the liquid compartments are intercommunicating, and so that the liquid will be charged to a uniform level. The construction and operation of this modified construction of apparatus is generally similar to that above described.

With the various constructions of apparatus illustrated, as the liquid boils in the compartment or compartments surrounding the catalyst tubes, the vapors pass into the upper part of the compartment or compartments where they serve to preheat the incoming reaction gases, and where the vapors may be themselves in part condensed. The uncondensed vapor then passes out into the reflux pipes and to the reflux condensers where it is condensed and returned.

If the apparatus is properly constructed and made tight, and if efficient condensing means is used, substantially all of the vaporized liquid can be condensed and returned, and the supply of liquid thereby continually replenished. In the case of mercury, for example, the apparatus has been used over long periods of operation with practically no mercury loss.

It will be evident that the necessary temperature regulating effect required for properly regulating the temperature will vary with different catalytic reactions. Where there is a large amount of heat of reaction to be absorbed and neutralized, the ratio of cooling surfaces to catalyst bulk (the latter being taken as a measure of the rate of producing exothermic heat of reaction) must be greater than for other reactions in which a smaller amount of heat of reaction is generated. In order to assure substantial uniformity of temperature in the catalytic mass, the catalyst should be sufficiently distributed throughout the temperature regulating system, or the temperature regulating means should be sufficiently distributed throughout the catalyst mass, or should be in sufficiently intimate heat interchanging relation therewith, that all parts of the catalyst will be subjected to the temperature regulating influence of the boiling liquid, and so that the parts of the catalyst most remote from the cooling surfaces of the system will not have too great a temperature difference from that of the boiling liquid.

While I have described and illustrated the preferred embodiments of the invention with considerable particularity, yet it will be understood that the invention is not limited to the specific construction and operation which is thus illustrated and described, and that variations and modifications may be made therein without departing from the spirit and scope of the invention.

From the foregoing description and from the accompanying drawings it will be seen that the present invention provides an improved catalytic apparatus which is particularly adapted for use in the carrying out of catalytic reactions which require control of the temperature within certain limits; and that the apparatus of the present invention enables such temperature to be controlled in a substantially continuous and automatic manner. It will be seen that the present invention provides what may be considered a constant temperature reservoir or series of reservoirs so arranged and distributed in the zone of reaction, and so constructed and operated as a part of a two-phase liquid-vapor system for regulating the temperature, that substantially all parts of the catalyst and of the reacting gases in the zone of reaction will be maintained within the proper temperature limits for the desired reaction. It will also be seen that the invention provides for the carrying out and regulation of reactions which require widely differing temperatures, inasmuch as the selection of a suitable liquid, and the control of the pressure in the temperature regulating system, with resulting control of the boiling temperature of the liquid, enable the temperature to be maintained constant at any desired temperature over a wide temperature range.

It will furthermore be seen that the present invention provides an apparatus which is not only adapted for absorbing the heat of strongly exothermic reactions, and of preventing excessive temperatures in the reaction zones of such reactions, but that it also enables heat to be supplied to the reaction zone to supplement the heat of reaction, or to enable reactions to be carried out which require heat to be supplied thereto; and that the heat is moreover supplied to the reaction under regulated conditions such that a substantially constant temperature can be continually and automatically maintained.

It will be seen that the invention includes the use of a liquid boiling at a temperature within a temperature range, within which range also lies the most desirable temperature for the reaction. Heat is removed without rise in temperature of the liquid and this temperature may be adjusted to widely different values by the application of the proper pressure thereto. The actual design, physical properties and relative dimensions of the integral parts of an apparatus depend upon the class and amount of reaction which is proposed for operation therein. All parts of the catalyst similarly disposed in relation to the cooling surface will have like temperatures irrespective of the heat evolution. The diameters of the tubes or slots, the relation of catalyst bulk to heat removing surfaces, and the heat conductivity of the catalyst mass are interdependent with the amount of heat which is to be evolved therein, and these must be in a proper relation to obtain a permissible temperature range within the individual masses of catalyst.

This application is a continuation in part of my copending application Ser. No. 303,337, filed June 11, 1919, temperature control in chemical reactions.

I claim:

1. A catalytic apparatus comprising a catalytic chamber and a two-phase liquid-vapor temperature regulating system for regulating the temperature in said catalytic chamber whereby the desired chemical reactions may be promoted, and means for regulating the pressure on said system.

2. A catalytic apparatus comprising a catalytic chamber and a two-phase liquid-vapor temperature regulating system for regulating the temperature in said catalytic chamber whereby the desired chemical reactions may be promoted, and means for condensing and returning liquid vaporized in said system.

3. A catalytic apparatus comprising a catalyzer chamber or compartment, a two-phase liquid-vapor temperature regulating system with the liquid phase of the system arranged in said chamber or compartment, and condensing means outside said chamber or compartment for condensing and returning vaporized liquid.

4. A catalytic apparatus comprising a catalyzer chamber or compartment containing the catalyst, a two-phase liquid vapor system for regulating the temperature of the catalyst, said system having its liquid phase intimately distributed with respect to the different parts of the catalyst so that all parts of the catalyst are subjected to the temperature regulating influence of the system, and said system being provided with means for maintaining a continual supply of liquid in heat interchanging relation with the catalyst and means for regulating the pressure in said system, whereby large quantities of heat of reaction can be absorbed by the boiling of the liquid in the temperature regulating system without change of temperature.

5. A catalytic apparatus comprising a catalyzer chamber or compartment containing the catalyst, a two-phase liquid-vapor temperature regulating system distributed in the catalyzer chamber in heat interchanging relation with the catalyst whereby the desired chemical reactions may be promoted, and means for condensing and returning liquid vaporized in said system, the different parts of the liquid and vapor phases of the system being in communication with each other.

6. A catalytic apparatus comprising a catalyzer chamber or compartment containing the catalyst, a series of liquid-containing compartments distributed through the catalyzer chamber in heat interchanging relation with the catalyst therein, means for condensing and returning the liquid vaporized in said compartments, and means for regulating the pressure and thereby the boiling point of the liquid in said compartments.

7. A catalytic apparatus comprising a catalytic chamber, a two-phase liquid-vapor temperature regulating system for regulating the temperature in said catalytic chamber of the apparatus whereby the desired chemical reactions may be promoted, means for condensing and returning the liquid vaporized in said system, and means for regulating the pressure and thereby the boiling point of the liquid in said system.

8. A catalytic apparatus comprising a catalyzer chamber or compartment containing the catalyst therein, and means for heating the catalyzer chamber, said means comprising a two-phase liquid-vapor system distributed through the catalyzer chamber, means for regulating the pressure in said system and means for heating the liquid in said system to its boiling point and thereby heating the catalyzer chamber to a similar temperature.

9. A catalytic apparatus comprising a catalyzer chamber or compartment containing a catalyst therein, a two-phase liquid-vapor temperature regulating system distributed in the catalyzer chamber in heat interchanging relation with the catalyst therein, heating means for heating the liquid in said system to its boiling point, means for condensing and returning the liquid vaporized in said system and means for regulating the pressure in said system.

10. A catalytic apparatus comprising a catalyzer chamber or compartment, a two-phase liquid-vapor temperature regulating system with the liquid-phase of the system in heat interchanging relation with the catalyzer in said chamber whereby the desired chemical reactions may be promoted, and means for bringing an incoming gaseous mixture into heat interchanging relation with the vapor-phase of the system before such mixture comes in contact with the catalyst.

11. A catalytic apparatus comprising a catalyzer chamber or compartment, a two-phase liquid-vapor temperature regulating system with its liquid-phase in heat interchanging relation with the catalyzer, means for preheating the incoming gaseous mixture by the vapors in the vapor-phase of the system, and additional condensing means for condensing the vapors in the vapor-phase of the system.

12. A catalytic apparatus comprising a vertically arranged catalyzer chamber or compartment having an inlet for the gaseous reaction mixture at the top and an outlet for the products of reaction at the bottom, a two-phase liquid-vapor temperature regulating system with its liquid-phase in heat interchanging relation with the catalyst in said chamber, and with its vapor-phase arranged in said chamber above the liquid phase and in heat interchanging relation with the incoming gaseous mixture.

13. A catalytic apparatus comprising a catalyzer chamber or compartment containing a catalyzer in a series of compartments, and a two-phase liquid-vapor temperature regulating system with its liquid-phase in heat interchanging relation with the catalyst and arranged to surround the compartments containing the catalyst, and means for regulating the pressure in said system.

14. A catalytic apparatus comprising a catalyzer chamber or compartment, and a two-phase liquid-vapor temperature regulating system for regulating the temperature in the catalytic chamber whereby the desired chemical reactions may be promoted, said system being adapted to withstand a wide variation in the pressure therein, and means for producing and maintaining wide differences of pressure in said system at different times, thereby varying and regulating the boiling point of the liquid in said system, whereby the temperature in the catalytic chamber can be varied.

15. A catalytic apparatus comprising a catalyzer chamber or compartment, a two-phase liquid-vapor temperature regulating system for regulating the temperature in the catalyzer chamber whereby the desired chemical reactions may be promoted, a reflux condenser arranged above the liquid-phase of the system for condensing and returning vaporized liquid, and pressure regulating means connected to said condenser.

16. A catalytic apparatus comprising a catalyzer chamber or compartment having an inlet at its top for the gaseous reaction mixture and an outlet at its bottom for the reaction products, a two-phase liquid-vapor temperature regulating system having its liquid-phase in heat interchanging relation with the catalyst in said chamber, and having its vapor-phase in heat interchanging relation with the incoming gaseous mixture before it reaches the catalyst, condensing means arranged above the catalyzer chamber for condensing and returning vaporized liquid which may not be condensed by the cooling effect of the incoming gaseous mixture, and pressure regulating means connected to said condensing means.

17. A catalytic apparatus comprising a catalyzer chamber or compartment, a two-phase liquid-vapor temperature regulating system for regulating the temperature in the catalyzer chamber whereby the desired chemical reactions may be promoted, the said system containing liquid mercury in its liquid-phase, and a condenser arranged to condense and return vaporized mercury.

18. A catalytic apparatus comprising a catalyzer chamber or compartment having a layer of catalyst therein, supported upon a perforated support permitting the passage of the gaseous reaction mixture therethrough, a two-phase liquid-vapor temperature regulating system having its liquid-phase distributed in heat interchanging relation with the catalyst, and means for condensing the vapors in the vapor-phase of the system and returning the condensed vapors to the liquid phase of the system.

19. A catalytic apparatus comprising a catalyzer chamber or compartment, a two-phase liquid vapor temperature regulating system with its liquid-phase in heat interchanging relation with the catalyst in said chamber, means for condensing vapors in the vapor-phase of the system and returning the condensed vapors to the liquid-phase, and the liquid-phase of the system having a sufficient surface in heat interchanging relation with the catalyst, and being sufficiently distributed with respect to the catalyst, so that all parts of the catalyst are maintained within a temperature range approximating that of the boiling point of the liquid in said system.

20. A catalytic apparatus comprising a catalyzer chamber or compartment, a two-phase liquid-vapor temperature regulating system with its liquid-phase in heat interchanging relation with the catalyst in said chamber, and such system being so distributed with respect to the catalyst that all of the parts of the catalyst are subjected to the temperature regulating influence of the same, and the ratio of the surface of the liquid-phase of the system to catalyst bulk being such that more than three square inches of surface are represented for each cubic inch of catalyst bulk.

21. A catalytic apparatus comprising a catalyzer chamber or compartment having a layer of catalyst therein, a two-phase liquid-vapor temperature regulating system for regulating the temperature in said chamber, said system having a series of intercommunicating compartments containing the liquid distributed through the layer of catalyst and maintained of a depth not less than the depth of the layer of catalyst, the system having a part of its vapor-phase in said chamber, and condensing means outside the chamber connected to the vapor space within the chamber, whereby the vapors escaping from the chamber are condensed and returned to the liquid-phase of the system of the chamber.

22. A catalytic apparatus comprising a catalyzer chamber or compartment having a layer of catalyst supported upon a perforated support, a series of compartments distributed through the layer of catalyst and containing liquid to a depth not less than the depth of the catalyst there, said compartments communicating with each other and having a vapor space above the liquid and a reflux condenser connected with such vapor space for condensing the vapors and returning the condensed vapors.

23. A catalytic apparatus for carrying out exothermic gas phase catalytic oxidation reactions of organic compounds, comprising a catalyzer chamber or compartment containing a catalyst adapted for such oxidation reactions, a temperature regulating system having a liquid-containing compartment in heat interchanging relation with the catalyst in the catalyzer chamber whereby the desired chemical reactions may be promoted, and a definite quantity of liquid mercury circulating in a closed circuit in such system, whereby the heat of the exothermic action is absorbed by the boiling of the mercury at a temperature approximating that of the catalytic reaction.

24. A catalytic apparatus for carrying out exothermic gas phase catalytic oxidation reactions of organic compounds, comprising a catalyzer chamber or compartment, a catalyst in said chamber adapted for such oxidation reactions, a two-phase liquid-vapor temperature regulating system containing liquid mercury in its liquid phase in heat interchanging relation with the catalyst in the catalyzer chamber, and condensing means for condensing and returning vaporized mercury, whereby the heat of the exothermic action is absorbed by the boiling of the mercury and whereby the supply of liquid mercury is continually replenished by the condensed vapors.

25. A catalytic apparatus for carrying out exothermic gas phase catalytic oxidation reactions of organic compounds, comprising a catalyzer chamber or compartment containing a catalyst adapted for such oxidation reactions, a two-phase liquid-vapor temperature regulating system containing liquid mercury in its liquid phase in heat interchanging relation with the catalyst in the catalyzer chamber, a condenser for mercury vapors, and pressure regulating means for varying and regulating the pressure on said system and the boiling point of the mercury therein, whereby the heat of the exothermic reaction is absorbed by the boiling of the mercury and the supply of mercury replenished by the condensed vapors and whereby the temperature of the boiling mercury can be varied and controlled by the pressure regulating means.

26. In an apparatus for controlling temperatures in chemical reactions, parallel rod-like masses of catalytic material surrounded on their sides by a liquid and means to condense vapors from said liquid and return the condensate to said liquid.

27. In an apparatus for controlling temperatures in chemical reactions, parallel, slender rod-like masses of catalytic material surrounded on their sides by liquid mercury and means to condense vapors from said mercury and return the condensate to the liquid mercury.

28. In an apparatus of the class described, catalytic material, means for bringing reacting gases into contact with said catalytic material, means for removing heat from the zone of reaction as latent heat of vaporization of a liquid, and applying it to said gases before they come into contact with said catalyst.

29. In an apparatus of the class described, catalytic material, means for bringing reacting gases into contact with said catalytic material, means for removing heat from the zone of reaction as latent heat of vaporization of a liquid, and applying it to said gases before they come into contact with said catalyst, and means for varying the pressure on said liquid.

30. In an apparatus of the class described, a liquid container, liquid in said container, catalytic material in contact with said container, and means for bringing reacting gases into contact with another portion of said container before bringing said gases into contact with said catalytic material.

31. In an apparatus of the class described, a liquid container, closed at its lower end, liquid in said container, catalytic material in contact with the lower portion of said container, a means for bringing reacting gases into contact with a higher part of said container, and then into contact with said catalytic material.

In testimony whereof I affix my signature.

CHARLES R. DOWNS.

fore they come into contact with said catalyst, and means for varying the pressure on said liquid.

30. In an apparatus of the class described, a liquid container, liquid in said container, catalytic material in contact with said container, and means for bringing reacting gases into contact with another portion of said container before bringing said gases into contact with said catalytic material.

31. In an apparatus of the class described, a liquid container, closed at its lower end, liquid in said container, catalytic material in contact with the lower portion of said container, a means for bringing reacting gases into contact with a higher part of said container, and then into contact with said catalytic material.

In testimony whereof I affix my signature.

CHARLES R. DOWNS.

Certificate of Correction.

It is hereby certified that in Letters Patent No. 1,604,739, granted October 26, 1926, upon the application of Charles R. Downs, of Cliffside, New Jersey, for an improvement in "Apparatus for Promoting Catalytic Reactions," errors appear in the printed specification requiring correction as follows: Page 1, line 80, for the word "relations" read *reactions;* page 4, line 85, for the word "of" read *or;* and that the said Letters Patent should be read with these corrections therein that the same may conform to the record of the case in the Patent Office.

Signed and sealed this 16th day of November, A. D. 1926.

[SEAL.]

M. J. MOORE,
*Acting Commissioner of Patents.*

Certificate of Correction.

It is hereby certified that in Letters Patent No. 1,604,739, granted October 26, 1926, upon the application of Charles R. Downs, of Cliffside, New Jersey, for an improvement in "Apparatus for Promoting Catalytic Reactions," errors appear in the printed specification requiring correction as follows: Page 1, line 80, for the word " relations " read *reactions;* page 4, line 85, for the word " of " read *or;* and that the said Letters Patent should be read with these corrections therein that the same may conform to the record of the case in the Patent Office.

Signed and sealed this 16th day of November, A. D. 1926.

[SEAL.]

M. J. MOORE,
*Acting Commissioner of Patents.*